US007310996B2

(12) United States Patent
Jacob et al.

(10) Patent No.: US 7,310,996 B2
(45) Date of Patent: Dec. 25, 2007

(54) SENSOR

(75) Inventors: Stefan Jacob, Denzlingen (DE); Torsten Neuhaeuser, Bahlingen (DE); Olaf Machul, Freiburg (DE); Josef Baak, Waldkirch (DE)

(73) Assignee: Sick AG, Waldkirch (DE)

( * ) Notice: Subject to any disclaimer, the term of this patent is extended or adjusted under 35 U.S.C. 154(b) by 139 days.

(21) Appl. No.: 11/230,797

(22) Filed: Sep. 20, 2005

(65) Prior Publication Data

US 2006/0059978 A1 Mar. 23, 2006

(30) Foreign Application Priority Data

Sep. 23, 2004 (DE) ..................... 10 2004 046 107

(51) Int. Cl.
*G01L 3/26* (2006.01)

(52) U.S. Cl. .......................................... 73/116; 73/116

(58) Field of Classification Search .................. 73/116; 310/30; 137/554; 474/110
See application file for complete search history.

(56) References Cited

U.S. PATENT DOCUMENTS 5,702,317 A * 12/1997 Kawashima et al. ........ 474/110
6,165,091 A * 12/2000 Dinca et al. ................ 474/112
6,321,781 B1 * 11/2001 Kurth ......................... 137/554
6,666,784 B1 * 12/2003 Iwamoto et al. ............ 474/109

FOREIGN PATENT DOCUMENTS

| | | | |
|---|---|---|---|
| DE | 3923063 | C3 | 10/1990 |
| DE | 4137586 | A1 | 5/1993 |
| DE | 19643413 | A1 | 5/1998 |
| DE | 19653222 | A1 | 7/1998 |
| DE | 69129231 | T2 | 10/1998 |
| DE | 29811901 | U1 | 11/1998 |
| DE | 20204874 | U1 | 12/2002 |
| DE | 10210636 | C1 | 5/2003 |
| DE | 10227425 | A1 | 1/2004 |
| DE | 10306461 | A1 | 9/2004 |
| EP | 0798473 | A2 | 3/1997 |
| EP | 0985631 | A2 | 3/2000 |
| EP | 1227250 | A2 | 11/2001 |

* cited by examiner

*Primary Examiner*—Jewel Thompson
(74) *Attorney, Agent, or Firm*—Townsend and Townsend and Crew, LLP

(57) ABSTRACT

A sensing system having at least one magnetic or inductive sensor for determining the position of a piston. The sensor system has a positioning device with which at least two sensing positions for the sensing system can be set and adjusted.

13 Claims, 4 Drawing Sheets

SENSOR

BACKGROUND OF THE INVENTION

This invention concerns sensing systems for determining one or more positions of a moving element, for example a piston movably disposed inside a cylinder.

More specifically, the present invention concerns magnetic and inductive sensors which are mounted on the housing of a working cylinder arrangement. Such sensors have been successfully employed for touchlessly determining the exact position of a pneumatic or hydraulic piston that is movable inside a working cylinder. For this, guide grooves are arranged on the exterior of the housing. Axially movable magnetic field sensors are placed in the grooves, and following adjustment they can be fixed in the guide groove at a desired position, as is described, for example, in published German patent applications DE 196 43 413 A1 and DE 196 53 222 A1. A sensor positioned and secured in this manner generates switching signals in dependency on the position of the piston. Several sensing positions arranged over the length of the stroke of the piston in the cylinder are often needed. Most frequently, the fully retracted and extended, terminal positions of the pistons must be determined. For each sensing position a sensor is necessary, so that for sensing the terminal positions two sensors are needed. The necessary two sensors are usually secured in the same groove. Since each sensor requires its own electrical connections for supplying voltage and current, signal conductors and hydraulic lines, a relatively large bundle of lines and conductors are required for just one working cylinder. If many working, e.g. pneumatic, cylinders are installed in a small space, as required, for example, by robotic grippers and small manipulating devices, serious space problems are encountered because of the large number of lines and conductors that must be accommodated. The problem is exacerbated when additional piston positions over and above the terminal positions must be monitored with a corresponding number of additional sensors.

SUMMARY OF THE INVENTION

It is an object of the present invention to provide a particularly simple and inexpensive sensor system which can determine more than just one position of a moving element, such as a piston position in a working cylinder.

The sensing system of the present invention has a positioning device which provides at least two sensing positions. A principal advantage of the invention is that a single system has the at least two sensing positions. As a result, only one system must be installed for determining two or more positions of a piston or the like. The sensing positions are adjustable, which allows a simple movement of the sensing positions for a given application, which makes the sensor system of the present invention highly adaptable. This in turn significantly reduces the heretofore necessary large number of electrical and signal conductors, connectors, hydraulic lines and the like, and the costs associated with their manufacture and installation.

In a first embodiment of the invention, the sensor system has only one sensor that has two triggering thresholds. The thresholds of the positioning device are preferably electronically adjustable, which is fast and convenient. This reduces the costs of the system because its mechanical construction remains the same. In addition, installation and adjustment times are reduced because the electronic adjustment of the triggering thresholds takes little time.

A sensor with electronic triggering thresholds can be constructed as an analog distance sensor, which, for example, can have a non-homogeneous winding density as is known from German patent publication DE 102 27 425 A1.

In a second embodiment of the invention, the sensing system has at least two magnetic or inductive sensors. Their spacing can be adjusted with the positioning device. The sensors are electrically coupled with at least one conductor, and an external electrical connector extends from only one of the sensors. Although this embodiment employs two sensors, and the two sensing positions are mechanically determined with the two sensors, a principal advantage of this embodiment is that it reduces the needed cabling by at least 50% because the at least two sensors are connected in series. This embodiment of the invention has only one external connector for the sensors of a working cylinder irrespective of the number of the sensors that are mounted on a working cylinder when a conductor electrically connects the sensors. This also reduces the installation time for the sensors on a cylinder and the installation of the working cylinder on a machine.

Production costs for the sensor system of the present invention are less than the sum of production costs for individual sensors because the various components, such as the cable or electronic support, can be simultaneously used by several sensors of the sensing system.

The sensors are preferably cylinder sensors for installation on working cylinders.

To save space, the sensors of the sensor system are attached to the working cylinder by fixing them in a common groove, preferably a T-shaped or a C-shaped groove, as is generally known from published German patent applications DE 196 43 413 A1 or DE 196 53 222 A1.

For determining the sensing positions, the sensors are fixed in the grooves at adjustable distances from each other with the positioning device, which preferably includes attachment bolts.

To save space, a further aspect of the present invention provides a conductor which connects the adjacent, opposite ends of the sensors to each other. In this manner, it is possible, for example, to arrange the sensors in a space-saving manner one after the other in a groove and placing the conductor that connects the sensor in the same groove. It is particularly advantageous to construct the conductor as a coiled cable because it is longitudinally extendable and retractable and thereby allows the adjustment of the sensing positions by sliding the individual sensors along the groove without interference, as is the case when fixed length conductors are used.

It is further advantageous to arrange the external electrical connection and the conductor on the opposite ends of the sensor from which the electrical connection extends.

For an improved and simplified adjustment of the distance between the sensors, it can also be advantageous to arrange the sensors in a longitudinally adjustable housing.

DESCRIPTION OF THE PREFERRED EMBODIMENTS

Figure 1:
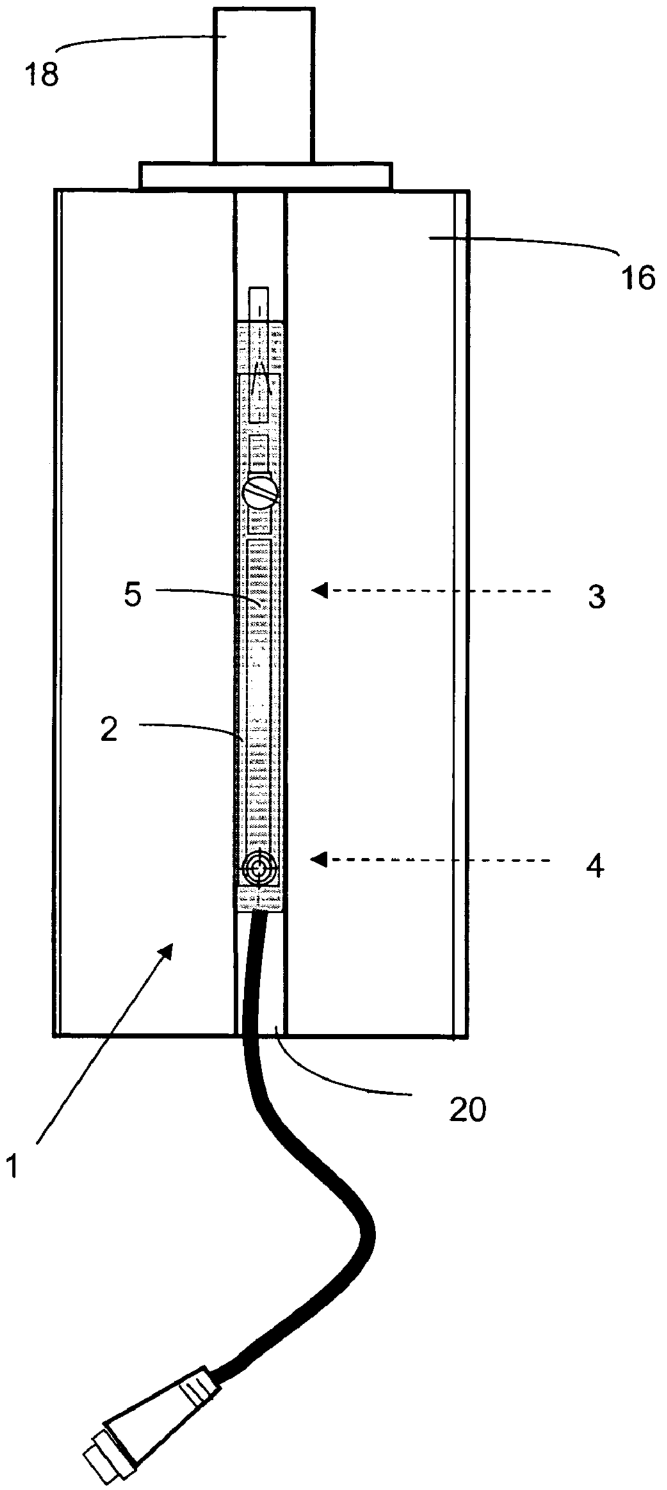
FIG. 1 shows a first embodiment of the sensor system of the present invention with a single sensor arranged on a working cylinder.

FIG. 1 shows a first embodiment of a sensor system 1 of the present invention which has only one sensor 2 constructed as a cylinder sensor. Sensor 2 is arranged in a guide groove 20 on the exterior of a working cylinder 16 in which a pneumatically, hydraulically or otherwise driven piston 18 moves. The sensor has two sensing positions 3, 4 in the form of electronic triggering thresholds which are electronically adjustable with a positioning device. The positioning device can be a mechanical device, for example a potentiometer, or it can be software which is programmed to electronically adjust the spacing between or location of the triggering thresholds and therewith the sensing positions. As an example, the sensing positions of sensor 2 can be the terminal positions of the piston travel in the cylinder. Sensor 2 can be an analog distance sensor which has as its primary electronic component a coil 5 with a non-homogeneous winding density.

Figure 2:
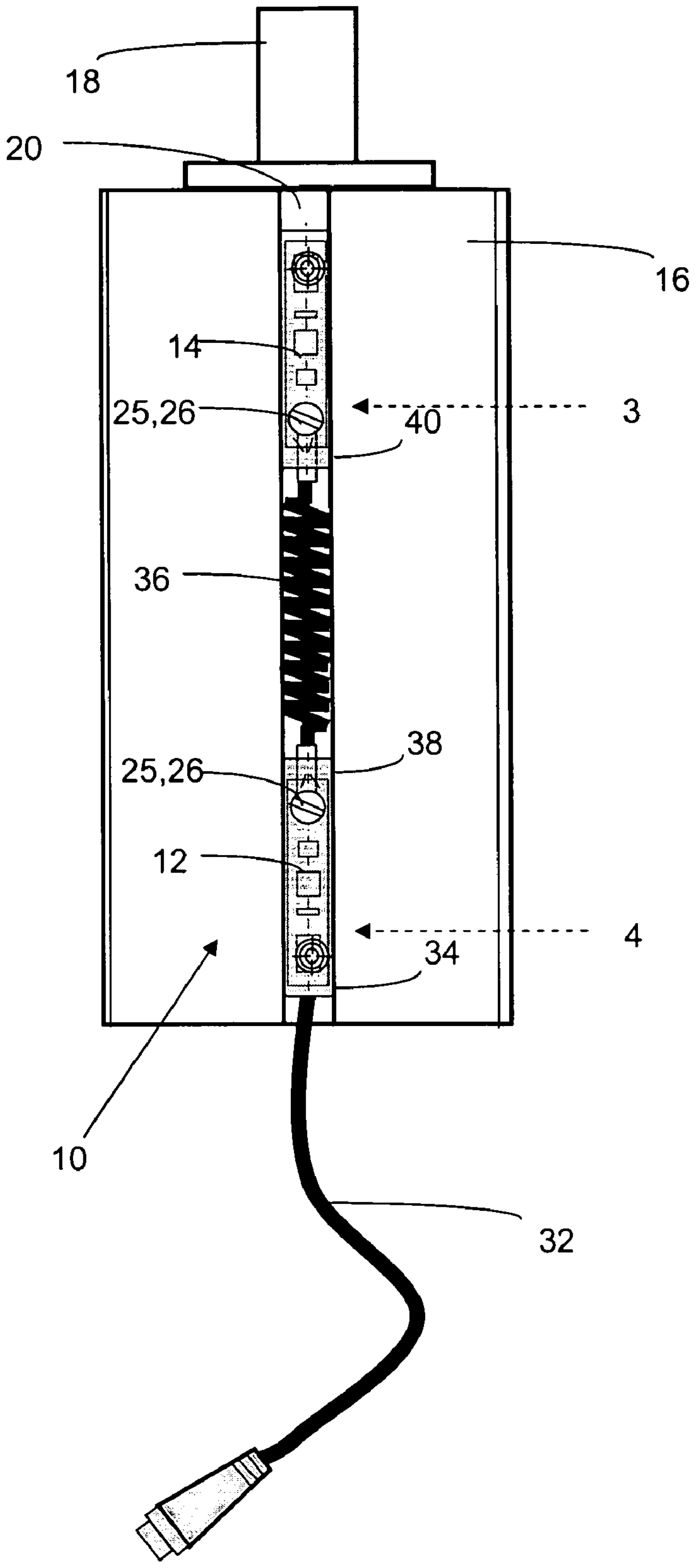
FIG. 2 shows a second embodiment of the present invention.

FIG. 2 illustrates a second embodiment of the present invention, a sensor system 10 that has at least two sensors 12, 14 made as cylinder sensors. Sensors 12, 14 can be installed, for example, on the exterior of a pneumatically operated working cylinder 16 which houses a pneumatically movable piston 18. As an example, sensors 12, 14 can be positioned to detect the terminal positions of piston 18, with sensor 12 being triggered when piston 18 is fully retracted and sensor 14 being triggered when piston 18 is fully extended. The two sensing positions are identified by reference numerals 3 and 4.

Figures 3A, 3B, 3C:
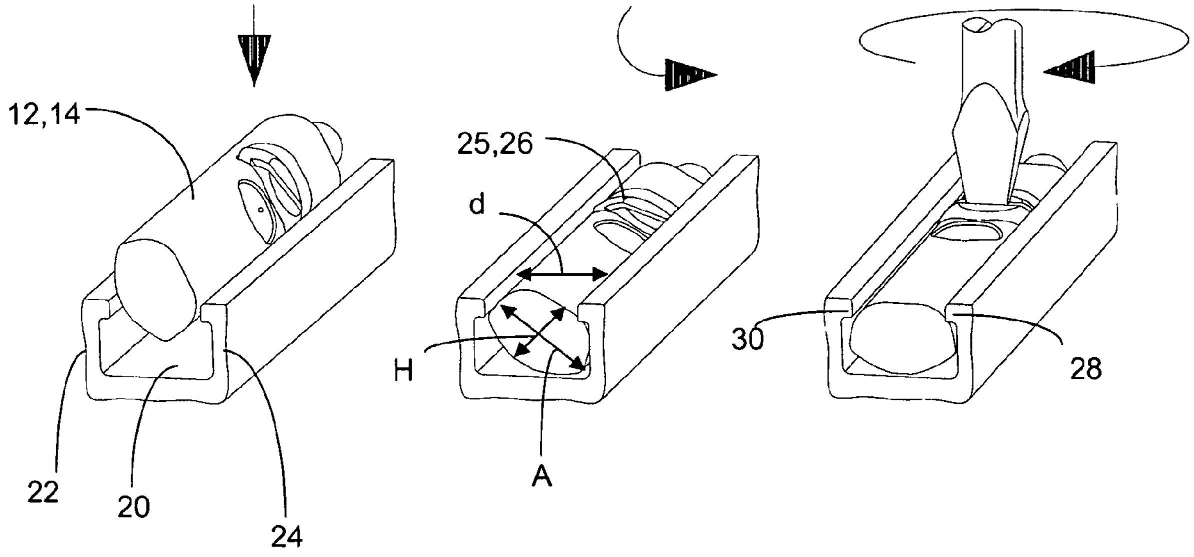
FIGS. 3*a, b* and *c* illustrate the mounting of the individual sensors in a groove.

Sensors 12 and 14 are fixed in guide groove 20 at the desired positions with a positioning device 25, as is illustrated in FIGS. 3*a-c*. Cylindrical sensors 12, 14 have an approximate elliptical cross-section with a major axis A that is greater than the width of longitudinal slit "d" of groove 20. Groove 20 has a T or C shape with lateral walls 22, 24 that are spaced apart by a distance greater than the width of slit "d". The minor axis H of cylindrical sensors 12, 14 is smaller than "d" so that the sensor can be inserted into groove 20 by moving the sensor from above in an inclined direction into the groove, as is illustrated in FIG. 3*a*. Sensors 12, 14 are then rotated about their longitudinal axis while in groove 20 as illustrated in FIG. 3*b*. At this point, the sensor cannot be removed from groove 20 without further rotation about its axis because its major axis A is greater than the width of slit "d". The sensors 12, 14 are fixed at the desired positions by tightening positioning device 25, for example with a securing bolt 26. Bolt 26 is rotated so that its head engages shoulders 28, 30 of the groove while sensors 12, 14 are pressed against the base of the groove. Alternatively, bolt 26 is tightened so that it engages the base of the groove while the sensor housing is pressed against groove shoulders 28, 30. In this way, the sensors 12 and 14 can be repositioned and fixed, respectively, along guide groove 20 by correspondingly loosening and tightening securing bolt 26.

In accordance with the present invention, the cabling for sensors 12 and 14 for supplying the needed voltage and current and for transmitting signals to and from the sensors is arranged so that only one connecting cable 32 for the entire sensor system is needed. Connecting cable 32 is coupled to only one of the sensors, in the illustrated example to sensor 12 at its left end 34 as illustrated in FIG. 2. Connecting cable 32 is used for supplying all current and voltage to both sensors 12 and 14 and for conducting the switching signals generated by sensors 12 and 14. A conductor 16 is arranged between sensors 12 and 14 which connects the opposite ends 38, 40 of the sensors to each other. Conductor 36 supplies sensor 14 with current and voltage and conducts the signals generated by sensor 14. This permits a serial connection of sensors 12 and 14, and conductor 36 is preferably also arranged in guide groove 20. It is preferred to form conductor 36 as a coiled cable so that the distance between the sensors can be readily adjusted and conductor 36 does not limit longitudinal adjustments.

Figure 4:
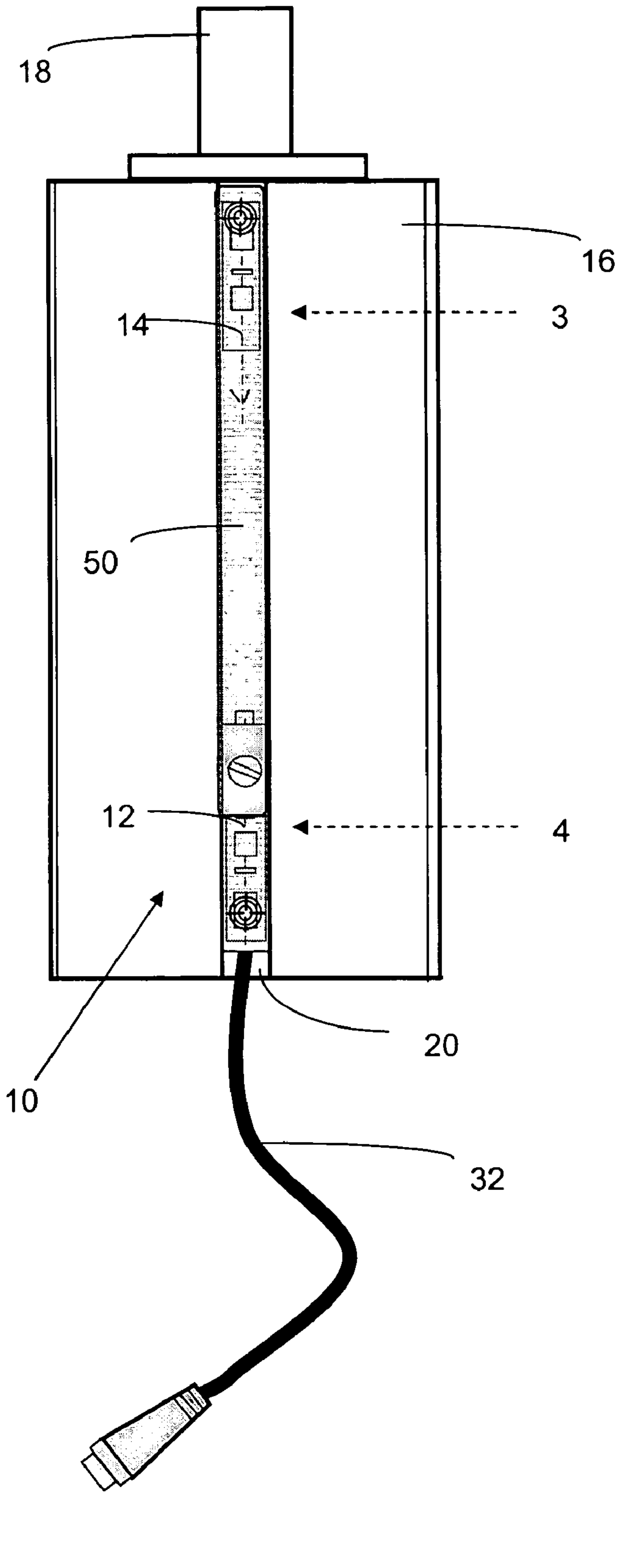
FIG. 4 is a view similar to FIG. 1 and shows a further embodiment of the invention.

A further embodiment of the present invention is shown in FIG. 4, where sensors 12, 14 are arranged in a housing 15 the length of which can be telescopically adjusted (not further illustrated in the drawings) to vary and fix the distance between the sensors as required by a given application or installation. The electrical connection between sensors 12 and 14 is constructed as described in the first embodiment of the present invention with a connector arranged inside housing 50. The individual sensors are positioned relative to each other by fixing the housing 50 in the groove in a manner analogous to the manner in which the sensors of the first embodiment are fixed, as is shown in FIGS. 3*a-c*. Sensors 12 and 14 are both fixed in the housing. Alternatively, sensor 12 only can be fixed in the groove. The fixation of the other sensor 14 is accomplished by telescopically increasing or decreasing the length of housing 50. This permits fixation of the entire sensor system with a single fixation bolt 26 for sensor 12.

What is claimed is:

1. A sensing system comprising at least two magnetic or inductive sensors for determining at least one position of a moving component, a positioning device operatively coupled with the sensors defining at least two adjustable sensing positions for sensing positions of the moving component, and, for fixing a distance between the sensors, at least one electric conductor connecting the sensors, and an electrical connection for supplying electrical power coupled to only one of the sensors.

2. A sensing system according to claim 1 comprising a single sensor defining first and second sensor triggering thresholds.

3. A sensing system according to claim 2 wherein the triggering thresholds of the sensor are electronically settable.

4. A sensing system according to claim 3 wherein the sensor is an analog sensor for determining distance.

5. A sensing system according to claim 4 wherein the sensor comprises a coil having a non-homogeneous winding density.

6. A sensing system according to claim 1 wherein the sensors comprise cylindrical sensors.

7. A sensing system according to claim 1 comprising a groove, and wherein the sensors are formed for being positioned in the groove.

8. A sensing system according to claim 7 wherein the groove has one of a T and a C cross-section.

9. A sensing system according to claim 1 wherein the positioning device comprises a securing bolt.

10. A sensing system according to claim 1 comprising a conductor which electrically connects opposing ends of adjacent sensors with each other.

11. A sensing system according to claim 1 wherein the electrical conductor and the electrical connection are arranged on opposite ends of the one sensor.

12. A sensing system according to claim 1 wherein the connector comprises a coiled cable.

13. A sensing system according to claim 1 including a longitudinally adjustable housing, and wherein the sensors are arranged in the housing.

* * * * *